United States Patent [19]
Stoerr et al.

[11] Patent Number: 5,288,221
[45] Date of Patent: Feb. 22, 1994

[54] APPARATUS FOR MAKING OPHTHALMIC LENSES

[75] Inventors: Jacques Stoerr, Oldsmar; Sidney S. White, Jr., Seminole; Horst H. Brytsche, Gulfport, all of Fla.

[73] Assignee: Essilor of America, Inc., St. Petersburg, Fla.

[21] Appl. No.: 885,108

[22] Filed: May 18, 1992

[51] Int. Cl.⁵ .................. B29C 45/80; B29D 11/00
[52] U.S. Cl. ........................... 425/125; 425/127; 425/129.1; 425/171; 425/141; 425/150; 425/174.4; 425/546; 425/555; 425/808; 425/812
[58] Field of Search .......... 425/808, 174.4, 141, 425/150, 425, 117, 125, 127, 129.1, 812, 546, 555, 171, 173; 264/1.4, 2.1, 2.2, 22, 2.4, 2.6; 156/275.5, 500

[56] References Cited

U.S. PATENT DOCUMENTS

| | | | |
|---|---|---|---|
| 3,902,693 | 9/1975 | Crandon et al. | 425/808 |
| 3,971,841 | 7/1976 | Rubinstein | 425/808 |
| 4,113,224 | 9/1978 | Clark et al. | 425/808 |
| 4,615,847 | 10/1986 | Howden | 264/1.4 |
| 4,640,805 | 2/1987 | Neefe | 264/2.1 |
| 4,702,574 | 10/1987 | Bawa | 425/808 |
| 4,714,232 | 12/1987 | Blot | 425/808 |
| 4,728,469 | 3/1988 | Danner et al. | 264/1.4 |
| 4,842,782 | 6/1989 | Portney et al. | 264/1.4 |
| 5,005,633 | 4/1991 | Mathews et al. | 425/808 |
| 5,028,358 | 7/1991 | Blum | 264/1.4 |
| 5,034,166 | 7/1991 | Rawlings et al. | 264/1.4 |
| 5,137,441 | 8/1992 | Fogarty | 425/808 |
| 5,154,861 | 10/1992 | McBrierty et al. | 264/2.1 |
| 5,188,650 | 2/1993 | Nomura | 425/808 |

*Primary Examiner*—Khanh Nguyen
*Attorney, Agent, or Firm*—Joseph C. Mason, Jr.; Ronald E. Smith

[57] ABSTRACT

An apparatus for mating a finished ophthalmic lens includes a pre-manufactured lens or lens wafer as a part of a mold for making the finished lens. A polymerizable lens material is injected between the lens or lens wafer and a conventional mold member and a trio of indexers are used to rotate the conventional mold member relative to the lens wafer, to adjust the spatial relationship between the conventional mold member and the lens or lens wafer, and to control the angular relation between them. The assembly is subjected to irradiation and the radiation cures the polymerizable lens material and fuses it to the lens wafer so that the lens or lens wafer becomes an integral part of the finished lens. The apparatus produces a finished lens in less than one hour.

10 Claims, 2 Drawing Sheets

APPARATUS FOR MAKING OPHTHALMIC LENSES

TECHNICAL FIELD

This invention relates, generally, to methods for making ophthalmic lenses. More particularly, it relates to a method where a premanufactured lens or lens wafer is used as one of the two molds required to make such lenses.

BACKGROUND ART

Prescriptions for ophthalmic lenses vary widely, of course, so it is impractical for any eye care professional to stock finished lenses, especially finished multifocal, finished progressive, and finished aspheric lenses. Multifocal and progressive lenses provide not only distance and near vision correction, but also astigmatic correction through 180 degrees of rotation, and are generally specific to left or right eyes. However, prescription finished single vision and multifocal ophthalmic lenses can be made by adhering together a pair of lens wafers at differing positions of adjustment therebetween. Accordingly, eye care professionals often carry large inventories of lens wafers so that finished lenses can be made therefrom. Unfortunately, the possible range of prescriptions is infinite for all practical purposes, so the number of lens wafers that must be carried in inventory is still very large.

More importantly, the making of a finished prescription lens by adhering together a couple of lens wafers is not a simple task. Even the cleanest, most careful labs commonly produce lens having dirt particles trapped therein, bubbles formed therein, improper alignment of the two wafers relative to each other, and other unacceptable characteristics.

The conventional wisdom has been to address these problems by developing better optical adhesives, better tools, and the like. Although such developments have been worthwhile, the industry is still plagued with large inventories of lens wafers and an unacceptably high rate of lens rejection.

There is a clear need, then, for an entirely new approach to the problem. What the new approach might be is not ascertainable by any study of the prior art.

DISCLOSURE OF INVENTION

The present invention eliminates the need for optical adhesives in the manufacture of finished prescription lens and thus represents a pioneering breakthrough in the art.

A premanufactured polymeric lens or lens wafer is employed as one of two molds required to produce the finished lens. A conventional glass, plastic, ceramic, or metal mold is employed as the second mold, a polymerizable lens material is injected between said two molds, and the relative positions of said two molds are adjusted as required by the prescription to produce the finished lens. The polymerizable lens material and the premanufactured lens or lens wafer adhere to one another through a combination of mechanical and chemical bonding. The joined lens material and the lens wafer are then removed from the glass, plastic, ceramic, or metal mold.

In this manner, one of the two molds used to make the lens is incorporated into the lens and becomes an integral part thereof.

The orientation of the two molds with respect to one another is accomplished by a pair of indexing means.

The indexing means control the position of one of the two molds while the other mold is held in a fixed position. A first indexing means controls the rotational relationship between the molds and a second indexing means controls the spatial relationship between them. An indicator associated with the first indexing means indicates the angular position of the movable mold on a real time basis and an indicator associated with the second indexing means similarly indicates the instantaneous spatial relationship between the two molds so that the shape and thickness of the polymerizable material between the molds is continuously known; this enables the eye care professional to adjust the indexing means as needed.

Curing of the polymerizable lens material is performed in mold; a source of suitable radiation accomplishes the curing in less than fifty minutes. Accordingly, the entire process can be performed in less than an hour, and the resulting lens is free of physical and chemical defects.

It will therefore be understood that the primary object of this invention is to revolutionize the art of ophthalmic lens manufacturing.

A closely related object is to accomplish the foregoing object by eliminating the need for eye care professionals to carry large inventories of lens or lens wafers.

Another closely related object is to accomplish the primary object by eliminating the need for optical adhesives in the manufacturing process.

Another object is to provide a lens-making method whereby a mold employed to make the lens becomes an integral part of the finished lens.

Still another important object is to enable the manufacturing of defect-free ophthalmic lenses in less than an hour so that eye care professionals may provide finished lenses to their patients on a very prompt basis.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar or like reference numerals refer to similar or like parts throughout the several views of the drawings.

BEST MODE FOR CARRYING OUT THE INVENTION

Figure 1:
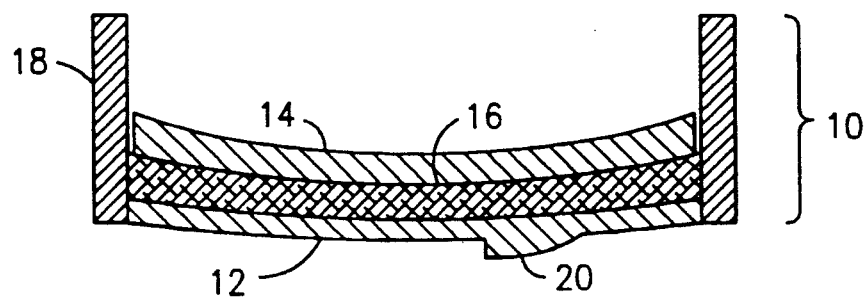
FIG. 1 is a side elevational, diagrammatic view of the molds used in accomplishing the objects of the invention.

Referring now to FIG. 1, it will there be seen that an illustrative embodiment of the novel mold assembly is denoted as a whole by the reference numeral 10.

In this particular embodiment, the pre-manufactured polymeric lens wafer or spheric power lens 12 is positioned in the front position, and the conventional glass, plastic, ceramic, or metal mold 14 is in the rearward position.

A filtered polymerizable lens material 16 is shown disposed in sandwiched relation between said molds 12 and 14, and a sealing ring 18 is disposed in surrounding relation to said molds and to said polymerizable material. Sealing ring 18 is made of a material that does not stick to the materials that form the lens or lens wafer 12, the lens material 16, or mold 14. Alternatively, a nonstick coating could be applied to ring assembly 18 before it is used.

Figure 2:
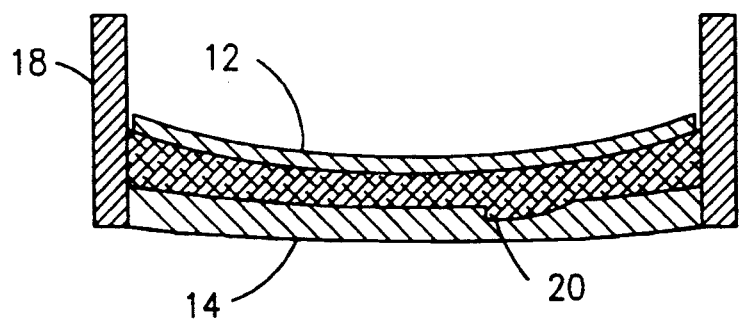
FIG. 2 is a similar view of a second arrangement of parts.

FIG. 2 shows a different arrangement of said parts. In FIG. 2, the glass, plastic, ceramic, or metal mold 14 is in the front position, and the pre-manufactured lens or lens wafer 12 is in the rearward position; the filtered polymerizable lens material 16 and sealing ring 18 are positioned as in the first embodiment. Note that a bifocal segment 20 is provided in pre-manufactured lens wafer 12 in the first embodiment, whereas said segment 20 is provided in the polymerizable lens material 16 in the second embodiment.

Figure 3:
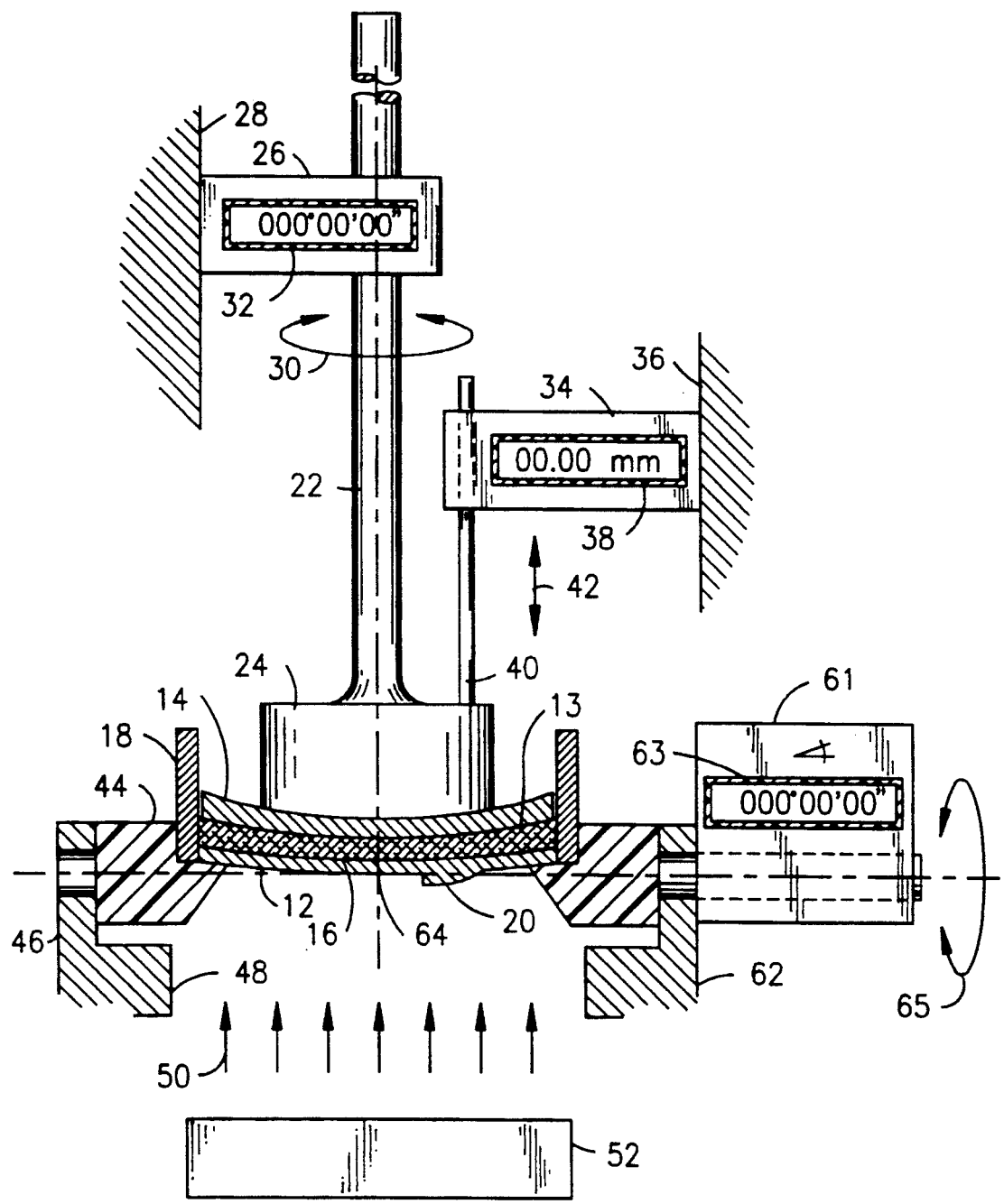
FIG. 3 is a side elevational, diagrammatic view of the apparatus used in conjuction with the molds of FIGS. 1 or 2 in producing the finished lenses.

In both embodiments, one of the two mold parts is held in a fixed position and the position of the other part is adjusted with respect to said fixed position as required to produce the finished lens. In the arrangement of FIG. 3, the mold parts are arranged as in FIG. 1, but it should be understood that the apparatus depicted in FIG. 3 has equal utility in connection with the embodiment of FIG. 2.

The spatial relation of back mold part 14 in FIG. 3, relative to immobile front lens 12, is controlled by arbor 22 having head 24 that bears against the concave surface of said back mold. Arbor 22 is mounted for axial and rotational movement and is under the control of first indexing means 26 and second indexing means 34. First indexing means 26 is fixedly secured to a support surface 28 and rotates arbor 22 about its rotational axis of symmetry as indicated by directional arrow 30. The degrees, minutes, and seconds of rotation are displayed in display window 32. In this manner, the eye care professional inputs information, by suitable means, into indexing means 26 concerning the desired rotational position of mold part 14 relative to lens or lens wafer 12; the indexing means 26 rotates arbor 22 into said desired position of rotational adjustment and displays the position of said arbor 22 on display screen 32.

The thickness of the polymerizable lens material 16 is determined by the spacing between mold parts 12 and 14; the axial position of movable mold part 14 is under the control of second indexing means 34. Said second indexing means 34 is mounted on support surface 36 and includes a display 38. Rigid rod 40 interconnects second indexing means 34 and head 24 of arbor 22 in the manner shown so that axial travel of rod 40, as indicated by the double-headed directional arrow 42, effects simultaneous and corresponding axial travel of arbor 22 and head 24. Second indexing means 34 is calibrated or reset and memorized so that it reads "zero" when no space exists between the two mold parts 12 and 14. Contact between the lenses would occur at the respective centers thereof for concave lenses and at the respective edges thereof for convex lenses. When display 38 indicates one millimeter, e.g., the operator knows that said mold parts are one millimeter apart from one another and that the thickness of the polymerizable material 16 in the cavity therebetween is also one millimeter.

Significantly, this invention is not limited (as is the wafer approach) by the thickness of the wafer or wafers. Lens wafers become very flexible, warped and difficult to handle. In this invention, the polymerizable lens material thickness is not a limiting factor.

Both indexing means may be manually operated or electronically controlled.

A third indexing means 61 for selectively controlling the tilt of the front lens, lens wafer, or mold member with respect to the back mold member, lens, or lens wafer is mounted on support surface 62 and includes a display 63 as indicated in FIG. 3. Means 61 is also employed to produce prism in finished lenses by rotating the front lens, lens wafer, or mold member relative to the back mold member, lens or lens wafer around reference point 64 as indicated by directional arrow 65. The degrees, minutes, and seconds of rotation are displayed in display window 63. In this manner, the eye care professional inputs information, by suitable means, into indexing means 61 concerning the desired rotational position of the front lens, lens wafer or mold member. This adds another degree of freedom to the apparatus and increases the variety of lens or lens wafers it can produce. Suitable controls are provided for all three indexing means.

The diameter of back mold 14 is slightly less than that of the front mold 12 so that when the cavity therebetween is filled with the polymerizable lens material 16, it is slightly overfilled to ensure against bubble formation; the excess material escapes from the cavity past the peripheral edges of the back mold 14 due to its smaller size when the second indexing means 34 drives the back mold toward the front mold. Alternatively, vent notches 13 as illustrated in FIG. 3. may be formed in the peripheral edge of said back mold to accomplish the same purpose.

The filtered polymerizable lens material 16 may be a partially pre-polymerized monomer or a non-prepolymerized monomer. Partially pre-polymerized monomer is generally very useful in reducing the overall time required for the curing process, particularly for thermal or ultraviolet induced reactions and in reducing the shrinkage observed during the molding process. Such shrinkage can cause cracked lens defects and early release from molds resulting in cosmetic and tinting defects. The occurrence of these defects causes yield problems.

Sealing ring 18 is supported at its periphery by a support means 44 which in turn is supported by a support surface 46. Support means 44 may take the form of an annular ring or a pin support system including a plurality of circumferentially spaced, radially disposed pins; FIG. 3 should be interpreted as showing both of said support means.

Support surface 46 is apertured as at 48 so that radiation 50 from a source 52 of radiation impinges upon the entire mold assembly; that radiation cures the polymerizable lens material 16. It may also be employed to cure lens wafer 12, as more fully set forth below.

Radiation source 52 may provide ultraviolet, thermal, microwave, electron beam, or other effective electromagnetic radiation, or combinations thereof.

Significantly, lens material 16 bonds to front mold 12 as it cures under the influence of radiation 52. The bonding is a product of the mechanical pressure established between said two parts, and of the chemical changes in the lens material 16 as it undergoes irradiation.

Bonding may further occur as a result of chemical changes attributable to irradiation of the front mold 12 as well. For example, front mold (lens or lens wafer) 12 may be pre-manufactured from the same materials employed in the making of polymerizable lens material 16. Thus, lens wafer 12 may include an unreacted ethylentic unsaturation of the type found in acrylic, allylic, styrenic, etc., lens systems. This unreacted material may react via free radical systems with the polymerizable lens material 16 or other materials containing thiol groups or other functional groups, thereby forming a chemical bond between mold 12 and lens material 16 and eliminating any need for conventional optical adhesives of the type relied upon by the prior art. Moreover, polyurethane and epoxy polymerizable lens material may bond even in the absence of irradiation.

When ultraviolet (UV) radiation is used for UV lens curing, the art teaches that a frosted glass mold may be used to diffuse said radiation. As an alternative to the use of such a frosted glass mold, this invention contemplates use of a diffused, mixed-spectrum, or moveable radiation curing source or other means of diffusing radiation before it reaches the lens substrate such as a stationary or moveable mesh screen, a stationary or moveable frosted or translucent material, a vibrating liquid, a heated gas or vapor, or any other means of diffusing radiation known in the art.

Bonding could also be achieved between the mold 12 and the lens material 16 by adding coupling compounds to either one or both of said members. Another alternative would include the application of a thin primer or coupling coatings, well known in the art, to the lens wafer 12 prior to its use as mold part 12. Moreover, lens wafer 12 could be used in an under-cured state so that it would cure under the influence of radiation 52 simultaneously with lens material 16 to thereby form an adhesive-less bond therebetween.

Lenses may be effectively produced by rotating the entire assembly of FIG. 3 up to ninety degrees in the plane of the paper, i.e., by orienting the molds 12 and 14 in a vertical or semi-diagonal plane. Filtered polymerizable lens material would then be injected into the cavity through fill ports formed in seal 18; bubble formation would be inhibited by filling the cavity from the top.

To provide a coated lens, lens or lens wafer 12 could be hard coated with a suitable abrasion-resistant coating prior to its use as the first mold part. Alternatively, the coating medium could be applied to the interior surface of the glass or metal mold 14 and said medium could be formulated to transfer from the mold 14 to the material 16 during the molding process. For example, a tintable or non-tintable abrasion-resistant hard coating would be partially cured by heat, ultraviolet radiation, or both, to maintain adherence to the mold until the radiation 52 is applied to the assembly. The hard coating is preselected for affinity to the lens material 16 so that it migrates to said lens material 16 during the curing process. A final post cure of the in-mold coating could be accomplished with electromagnetic radiation while the lens remains in the mold or after it has been removed therefrom.

Thus, this invention minimizes the number of lens or lens wafers and glass, plastic, ceramic, or metal molds that need to be maintained in inventory by the eye care professional. The back molds can be used for a wide range of front base curves, for example.

Progressive and lenticular lenses utilizing modern front curve technology may also be produced by the novel methods disclosed herein.

This invention is clearly new and useful. Moreover, it was not obvious to those of ordinary skill in this art at the time it was made, in view of the prior art considered as a whole as required by law.

This invention pioneers the art of adhesive-free ophthalmic lenses. Accordingly, the claims that follow are entitled to broad interpretation, as a matter of law, to protect from piracy the heart or essence of this breakthrough invention.

In the following claims, the term "lens wafer" shall be interpreted as meaning "lens or lens wafer," as used throughout this specification.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An apparatus for making an opthalmic lens, comprising:
   a movably mounted first mold member;
   means for rotating said first mold member;
   a second mold member in the form of a lens wafer, said lens wafer disposed in spaced relation to said movably mounted first mold member;
   a sealing ring disposed in circumscribing relation to said first mold member and said lens wafer;
   first indexing means for selectively controlling a rotatably position of said first mold member with respect to said lens wafer;
   means for injecting a preselected polymerizable material into a cavity defined by said first mold member, said lens wafer, and said sealing ring; and
   radiation means for curing said polymerizable material;
   whereby said lens wafer and said polymerizable material are fused to one another when the polymerizable material is cured by radiation; and
   whereby said lens wafer is an integral part of the finished lens.

2. The apparatus of claim 1, further comprising a second indexing means for selectively controlling the spacing between said first mold member with respect to said lens wafer.

3. The apparatus of claim 2, further comprising a third indexing means for selectively controlling a tilt of said second mold member with respect to said first mold member.

4. The apparatus of claim 1, further comprising means for supporting said first mold member, said lens wafer, and said sealing ring about the periphery of said sealing ring so that all of said lens wafer and polymerizable material are exposed to radiation from said radiation means.

5. The apparatus of claim 1, wherein said first mold member has a diameter slightly less than the diameter of said lens wafer so that excess polymerizable material in said cavity escapes said cavity by flowing past the outer peripheral border of said first mold member when said first mold member is moved toward said lens wafer.

6. The apparatus of claim 1, further comprising a plurality of vent notches formed in the peripheral edge of said first mold member so that excess polymerizable material in said cavity escapes said cavity by flowing through said vent notches when said mold member is moved toward said lens wafer.

7. The apparatus of claim 2, further comprising an elongate arbor member disposed in abutting engagement with said first mold member, said arbor member being mounted for rotation about its axis so that rotation of said arbor member effects rotation of said first mold member with respect to said lens wafer, and said rotation of said arbor member being under the control of said first indexing means.

8. The apparatus of claim 7, wherein said first indexing means is mounted to a fixed position support surface, and wherein said first indexing means includes a display means that indicates the instantaneous rotational position of said arbor member and hence of said first mold member with respect to said lens wafer.

9. The apparatus of claim 8, wherein said second indexing means is mounted to a support surface, and wherein said second indexing means includes a display means that indicates the instantaneous spacing between the first mold member and the lens wafer and hence the thickness of the polymerizable material in said cavity.

10. The apparatus of claim 1, wherein radiation from said irradiation means forms free radicals that fuse together the polymerizable lens material in said cavity and the material from which the lens wafer is made so that said lens wafer and polymerizable lens material become an integral whole.

* * * * *